United States Patent
Hagarty et al.

(10) Patent No.: US 6,858,802 B2
(45) Date of Patent: Feb. 22, 2005

(54) EXTENSION RING FOR ELECTRICAL JUNCTION BOX INSTALLATIONS

(75) Inventors: Robert J. Hagarty, Spokane, WA (US); Michael T. Whaley, Spokane, WA (US)

(73) Assignee: Randl Industries, Inc., Spokane, WA (US)

( * ) Notice: Subject to any disclaimer, the term of this patent is extended or adjusted under 35 U.S.C. 154(b) by 0 days.

(21) Appl. No.: 10/459,081

(22) Filed: Jun. 9, 2003

(65) Prior Publication Data

US 2004/0051648 A1 Mar. 18, 2004

Related U.S. Application Data

(60) Provisional application No. 60/389,155, filed on Jun. 14, 2002.

(51) Int. Cl.[7] .................................. H01H 9/02
(52) U.S. Cl. ............................ 174/58; 174/53; 220/3.2; 340/287; 361/600
(58) Field of Search ............................ 174/50, 58, 53, 174/66, 67; 220/3.8, 3.2, 241, 242; 33/528; 340/287; 361/600

(56) References Cited

U.S. PATENT DOCUMENTS

| | | | |
|---|---|---|---|
| 1,954,391 A | 4/1934 | Matson | |
| 3,288,910 A | 11/1966 | Zerwes | |
| 4,265,365 A | 5/1981 | Boteler | |
| 4,874,904 A | 10/1989 | DeSanti | |
| 4,927,039 A | 5/1990 | McNab | |
| 5,084,596 A | 1/1992 | Borsh et al. | |
| 5,272,279 A | 12/1993 | Filshie | |
| 6,066,803 A | 5/2000 | Hagarty | |
| 6,103,972 A | 8/2000 | Hagarty | |
| 6,164,475 A | 12/2000 | Jorgensen | |
| 6,573,449 B2 * | 6/2003 | Vrame | 174/58 |
| 6,590,155 B2 * | 7/2003 | Vrame et al. | 174/50 |
| 6,608,252 B2 * | 8/2003 | Hurley | 174/58 |

* cited by examiner

*Primary Examiner*—Dhiru R. Patel
(74) *Attorney, Agent, or Firm*—Christensen O'Connor Johnson Kindness PLLC (57) ABSTRACT

A junction box assembly for weather-resistant installations is disclosed including a junction box (100) and an extension ring (116, 216) adapted to attach with an component such as an alarm signaling unit (118, 218). The junction box assembly enables a relatively uniform compressive force about the periphery of the alarm signaling unit, such that a good, weather resistant seal is produced between a sealing surface (159, 259) on the alarm signaling unit and a mounting surface (161). In an embodiment of the assembly the extension ring (216) includes a flange (244) that attaches to the junction box, an large aperture (247) providing access to the interior of the junction box, and a mounting plate (266) including a threaded aperture (254) that is centrally located to align with a mounting aperture (242) in the alarm signaling unit. A gasket (219) may be provided between the signaling unit and the sealing surface.

6 Claims, 6 Drawing Sheets

EXTENSION RING FOR ELECTRICAL JUNCTION BOX INSTALLATIONS

CROSS-REFERENCE TO RELATED APPLICATION

This application claims the benefit of U.S. Provisional Application No. 60/389,155, filed Jun. 14, 2002, the benefit of which is hereby claimed under 35 U.S.C. § 119 and incorporated herein by reference.

FIELD OF THE INVENTION

The present invention relates generally to extension rings and, more particularly, to extension rings for weather-resistant mounting of electrical components, such as alarm signaling units.

BACKGROUND OF THE INVENTION

Figure 1:
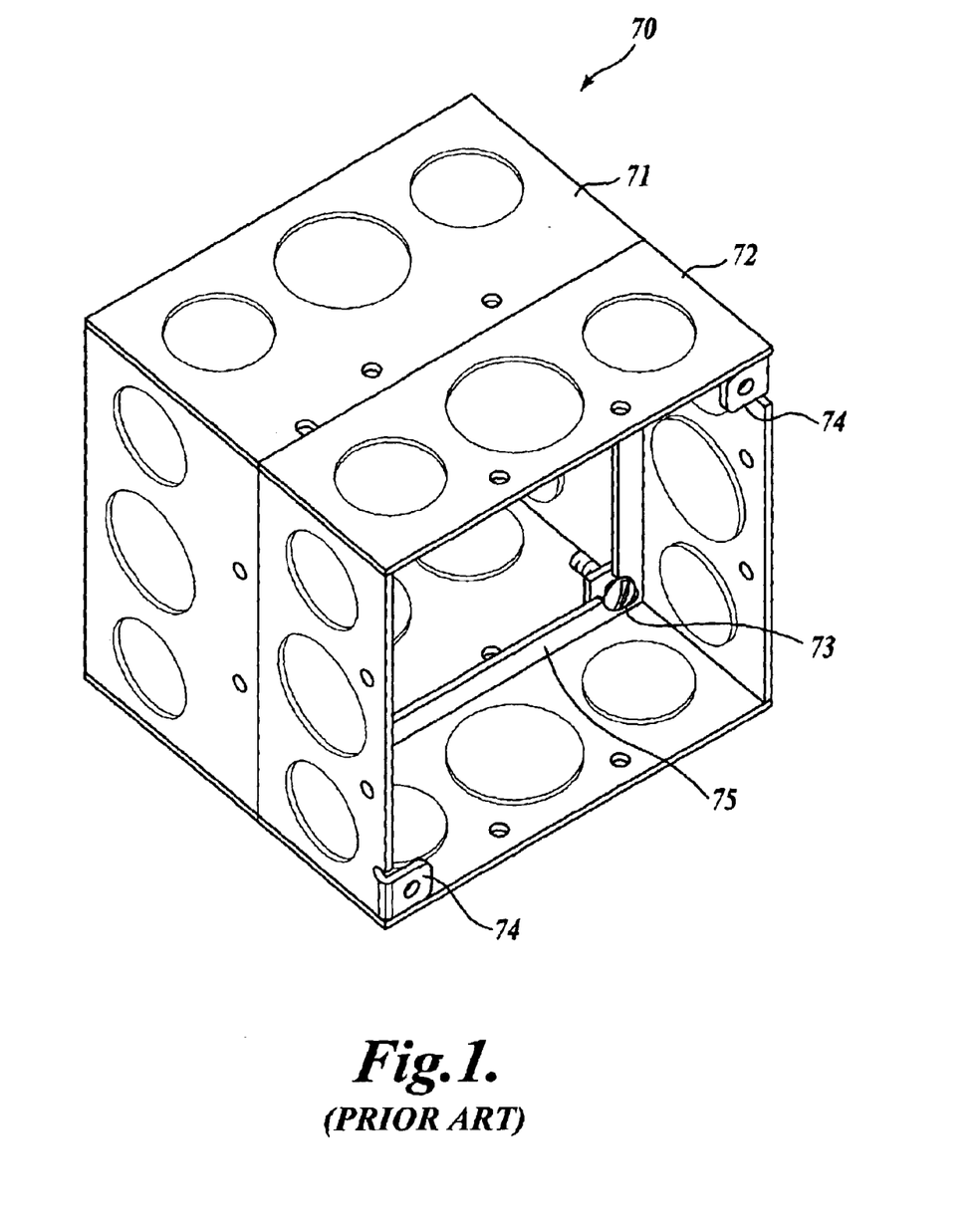
FIG. 1 is a perspective view of a prior art extended junction box.

Conventional electrical junction boxes are four inches square (i.e., four inches on a side) and two and one-eighth inches deep. In approximately 1978, fire alarm signaling units of the type including a strobe light and either an audio speaker or chimes, sometimes called speaker-strobe or chime-strobe alarm signaling units, were introduced. Conventional junction boxes were inadequate in size to accommodate the alarm signaling units (or similar devices) and the electrical conductors necessary to power the signaling units. Accordingly, the industry began to use an extension ring in combination with a conventional junction box, as shown in FIG. 1.

The extended junction box assembly 70 includes a conventional four inch by four inch by two and one-eighth inch deep junction box 71 having a four inch by four inch by one and one-half inch extension ring 72 connected thereto with screws 73 (one shown). The forward end of the extension ring 72 is provided with a pair of diagonally-opposed flanges or mounting brackets 74 for mounting a device such as an alarm signaling unit thereto (not shown). However, this extended four-inch square combination unit has been found to have a few disadvantages. In particular, the available volume inside the extended junction box assembly 70 is still often inadequate to contain both the alarm signaling unit and various electrical conductors that must be accommodated in the box for powering the particular alarm signaling unit and related components (e.g., other alarm signaling units and/or other electrical devices down the line).

The extension ring 72 depth is limited to one and one-half inches because the combined depth of a conventional four square junction box 71 and a one and one-half inch deep extension ring 72 is the maximum that will approximately fit in a three and one-half inch conventional stud space when mounted on a bar hanger. In fact, the combined depth of about three and three-quarters inches may cause a small but undesirable bow on the back side of the wall when mounted on a bar hanger. Furthermore, as shown in FIG. 1, the inner flange or ridge 75 that facilitates joining the junction box 71 and the extension ring 72, can interfere with the conductors and terminal strip of the device as they are installed in the assembly.

Figure 2:
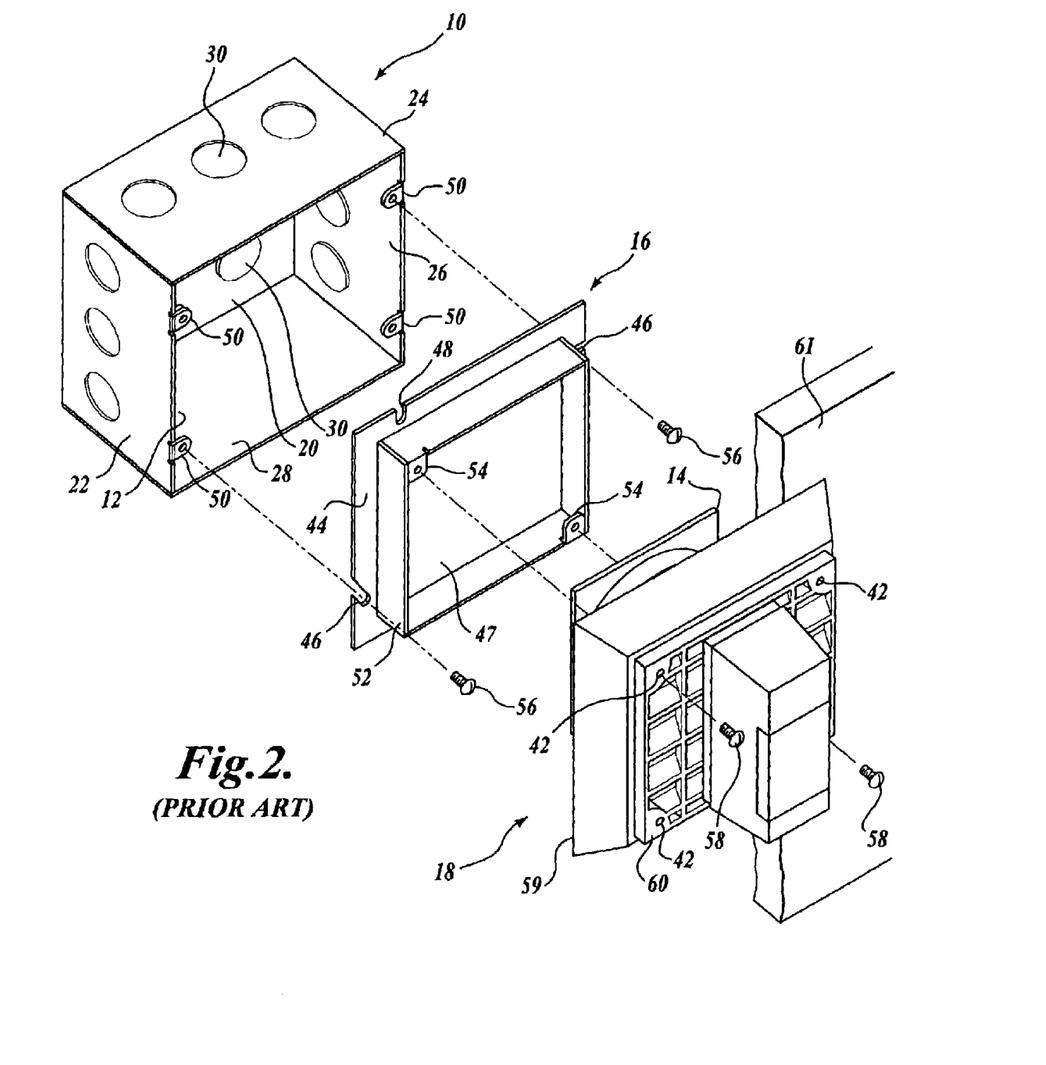
FIG. 2 is an exploded perspective view of a prior art second generation extension ring in combination with a junction box and an alarm signaling unit.

To mitigate these problems, a second generation electrical junction box and adapter ring assembly was developed, as disclosed in U.S. Pat. No. 6,103,972, the disclosure of which is hereby expressly incorporated by reference. Referring to FIG. 2, the second generation junction box 10 defines a cavity 12 that is designed to receive the speaker portion 14 or other protruding structure of an alarm signaling unit 18, such as a speaker-strobe signaling unit. An adapter or an extension ring 16 provides an interface between the junction box 10 and the alarm signaling unit 18.

The junction box 10 includes a rear wall 20 and four forwardly-extending sidewall panels 22, 24, 26, and 28. In order to accommodate both the speaker portion 14 of the alarm signaling unit 18 and associated electrical wires and connections, and still fit within the space typically provided between a wall (e.g., sheetrock) and an interior bar hanger on which the assembly will typically be mounted, the improved junction box 10 measures approximately five inches square and two and seven-eighths inches deep. The rear wall 20 of the junction box 10 includes a number of conventional knock-outs 30, as do the sidewalls 22, 24, 26, and 28, for receiving the ends of conductor-carrying conduits (not shown) and connectors (not shown).

The extension ring 16 includes a substantially square peripheral flange 44, each side of which is approximately five inches in length and one-half inch wide, so as to define an approximately four inch square opening 47 for receiving the speaker portion 14 of the signaling unit 18. Screw slots 46 and 48 are provided in the flange 44 and are positioned so that at least two of the slots will align with screw holes in two of four mounting brackets 50 provided on the front edges of two sidewalls 22 and 26 of the junction box 10. An approximately four inch square flange or wall 52 extends forwardly from the flange 44. Mounting brackets 54 are provided in two diagonally opposite corners so as to align with two of the mounting screw holes 42 in the conventional alarm signaling unit 18.

To assemble the second generation junction box 10 and extension ring 16 to the signaling unit 18, the extension ring 16 is first mounted on the junction box 10 via screws 56 which extend through slots 46 or 48 in the flange 44 of the extension ring 16 and through the holes in mounting brackets 50 on the front five inch square peripheral edge of the junction box 10. The alarm signaling unit 18 is mounted to the extension ring 16 with screws 58 extending through two diagonally-opposed mounting holes 42 in the front grill panel 60 of the alarm signaling unit 18 and into the aligned holes of two diagonally-opposed, aligned mounting brackets 54 of the extension ring 16, wherein the speaker portion 14 extends into the cavity 12 in the junction box 10. As the screws 58 are tightened, a sealing surface 59 of the signaling unit 18 is pressed against a mounting surface 61, such as an interior wall. As so assembled, the enlarged area in the cavity 12 of the junction box 10 will accommodate the speaker portion 14 and a relatively large number of conductors (not shown), some of which will attach to the speaker portion 14, and others of which will then pass through the junction box 10 and on to the next alarm signaling unit (or other electrical device) down the line, thereby avoiding the need for multiple junction boxes.

Although this second generation junction box 10 and extension ring 16 are effective for dry and/or interior applications, there remains a need for a junction box assembly that provides a semi-flush or flush mounted, weather-resistant exterior installation of alarms and the like. It was found that when the signaling unit 18 is mounted to a mounting surface 61 through the use of two diagonally opposed mounting brackets 54, as shown in FIG. 2, it is difficult to achieve a weather-resistant seal between the sealing surface 59 and the mounting surface 61. The diagonal connections do not provide a uniform force about the perimeter of the signaling unit 18, and may cause the signaling unit 18 to distort slightly, diminishing the ability of the sealing surface 59 to form a contaminate- and weather-resistant seal upon the mounting surface 61. Thus, water and other contaminates may infiltrate the signaling unit 18 and electrical components contained within the junction box 10. Contaminate infiltration may provide a safety hazard, as it may cause electrical shorts resulting in a fire or may cause the signaling unit to become inoperative, in addition to causing costly component damage.

In many prior art installations a weather-resistant seal is provided by using a specifically designed box adapted to receive the signaling unit (or similar device). Such boxes are designed to mount directly to an exterior surface of a building. A disadvantage to these prior art boxes is that they protrude relatively far from the wall, and they require the conduit coupled to the junction box to be run along an exterior surface of the wall. Such exterior mounted conduit is unsightly and susceptible to impact damage.

Similarly, there is a need for an extension ring compatible for use with alarm signaling units 18 having only a single mounting aperture. For example, the extension ring 16 pictured in FIG. 2 is incompatible with certain alarm signaling units of the type having a single, centrally located mounting aperture.

Accordingly, it is an object of the present invention to provide an electrical junction box extension ring which will permit the convenient and contaminate resistant mounting of an alarm signaling unit upon a mounting surface.

Another object of the present invention is to provide an electrical junction box extension ring, which permits the mounting of a signaling unit having a single mounting aperture to an electrical junction box.

SUMMARY OF THE INVENTION

The foregoing and other objects of the present invention have been realized by providing a junction box having a generally square rear panel and four sidewall panels defining a box that is open at the front end. An extension ring or adaptor is removably attachable to the junction box, generally over the open front end. The extension ring is adapted to engage a component such as an alarm signaling unit having a front panel, such that a relatively uniform sealing force can be applied about the periphery of the front panel, to produce a weather resistant seal.

In an embodiment of the invention the extension ring includes a square outer flange portion and a center portion having a large aperture and a transverse plate including a small threaded aperture, the threaded aperture adapted to receive a mounting screw that is inserted through a corresponding aperture in the alarm signaling unit, to attach the alarm signaling unit to the extension ring.

In an embodiment of the invention the extension ring is formed from a unitary panel.

In an embodiment of the invention a rearwardly extending portion of the alarm signaling unit extends through the large aperture in the extension ring and into the junction box.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 3:
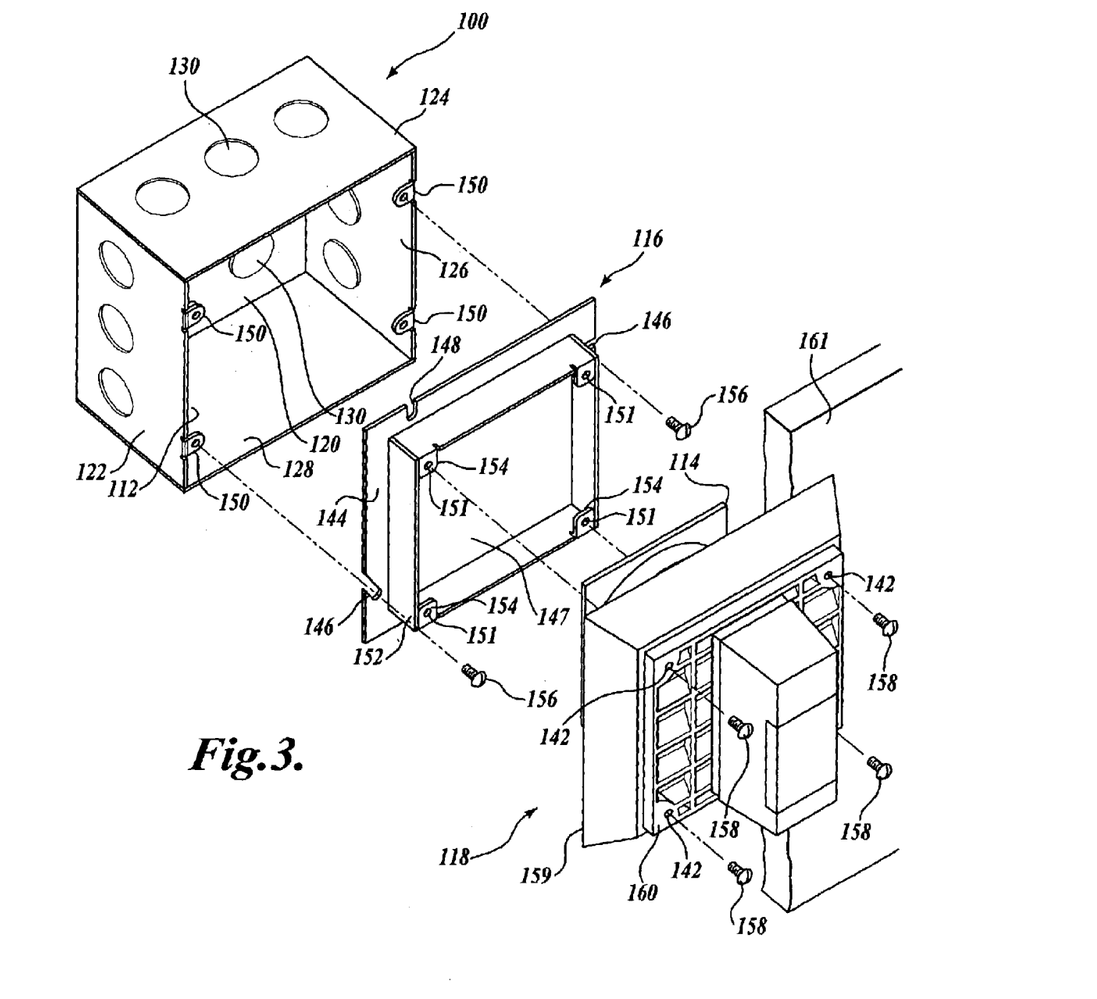
FIG. 3 is an exploded perspective view of one embodiment of a junction box assembly formed in accordance with the present invention, shown as a combination including an extension ring, a junction box and an alarm signaling unit.
Figure 4:
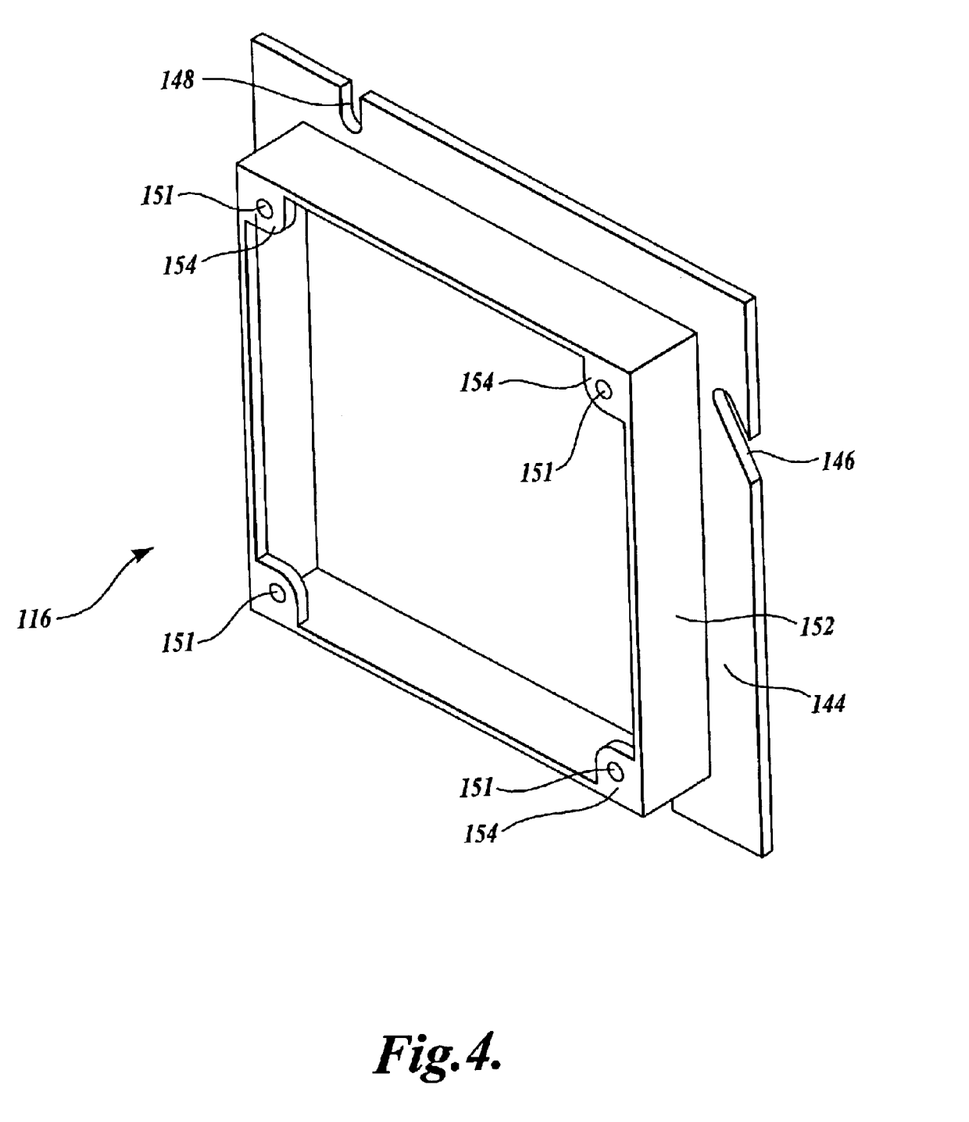
FIG. 4 is a perspective view of the extension ring shown in FIG. 3.

One embodiment of a junction box assembly, and in particular, an extension ring 116 formed in accordance with the present invention is illustrated in FIGS. 3 and 4. Referring to FIG. 3, the improved extension ring 116 provides an interface between a junction box 100 and an alarm signaling unit 118, such as a speaker-strobe signaling unit. The advantages of the extension ring 116 will become more readily appreciated in comparison to a junction box 100 that will be described first, followed by a discussion of the extension ring 116.

The junction box 100 defines a cavity 112 that is designed to receive the wires and a speaker portion 114 or other protruding structure of the signaling unit 118. The cavity 112 is defined by a rear wall 120 and four forwardly-extending sidewalls 122, 124, 126, and 128. In order to accommodate both the speaker portion 114 of the signaling unit 118 and various electrical wires and still fit within the space typically provided between the wall and interior bar hanger on which the assembly will typically be mounted, the junction box 100 measures approximately five inches square and two and seven-eighths inches deep.

The rear wall 120 of the junction box 100 includes a number of conventional knock-outs 130, as do the sidewalls 122, 124, 126, and 128, for receiving the ends of conductor-carrying conduits (not shown) and/or connectors (not shown) therefore. The rear wall 120 of the junction box 100 also includes a plurality of mounting holes (not shown) for accommodating screws to mount the junction box 100 on a bar hanger or other structure (not shown).

Still referring to FIG. 3, and also to FIG. 4, which shows a perspective view of the extension ring 116 in isolation, it can be seen that the extension ring 116 serves as an adapter by providing an interface connection between the approximately five inch square junction box 100 and the mounting screw holes 142 provided in the alarm signaling unit 118, where the mounting holes 142 are spaced to form a square mounting pattern. The extension ring 116 includes a substantially square peripheral flange 144, each side of which is approximately five inches in length and one-half an inch wide, so as to define an approximately four inch square opening for receiving the speaker portion 114 of the signaling unit 118. Screw slots 146 and 148 are provided in the flange 144 and are positioned so that at least two of the slots will align with screw holes in two of four mounting brackets 150 provided around the periphery of the front edge of the junction box 100. An approximately four inch square flange or wall 152 extends forwardly from the flange 144. In a preferred embodiment the wall 152 extends approximately five-eighths of an inch from the flange; however, the wall 152 may extend a greater or lessor distance from the flange 144 to accommodate different applications, including, for example zero inches or one and a half inches. Four mounting brackets 154 are provided, one located in each corner, so as to align with four diagonally-opposed screw holes 142 (three shown) in the conventional signaling unit 118.

The mounting brackets 154 may be formed as an integral part of the wall 152—for example, by bending a tab portion inwardly. An aperture 151 is provided, generally near the center of each mounting bracket 154, and is preferably threaded to receive mounting screws 158. The mounting brackets 154 may be fixedly attached to two adjacent portions of the wall 152 in a corner, as shown in FIG. 4. It will be apparent to one of skill in the art that attaching the mounting brackets 154 to two sidewalls will improve the rigidity of both the mounting brackets 154 and the extension ring 116, as well as ensure precise center-to-center dimensions of the apertures 151 so as to accurately align with the four diagonally-opposed mounting holes 142 in the front grill panel 160 of the signaling unit 118.

To assemble the improved extension ring 116, junction box 100, and a conventional signaling unit 118, the extension ring 116 is first mounted on the junction box 100 with screws 156 that extend through slots 146 or 148 in the flange 144 of the extension ring and through the screw holes in the mounting brackets 150 of the junction box 100. The signaling unit 118 is then mounted to the extension ring 116 via four mounting screws 158 extending through the four diagonally-opposed mounting holes 142 (three shown) in the front grill panel 160 of the signaling unit 118 and into the aligned holes 151 of four diagonally-opposed, aligned mounting flanges 154 of the extension ring, with a protruding structure of the signaling unit 118, such as a horn or a speaker 114, extending into the cavity 112 in the junction box 100. As the screws 158 are tightened, a sealing surface 159, that may include a gasket (not shown), is pressed against a mounting surface 161, such as an exterior surface of an exterior wall. As so assembled, the enlarged area in the cavity 112 of the junction box 100 will accommodate the speaker 114 and a relatively large number of conductors.

It will be appreciated that by providing tightening screws at all four corners, a relatively tight, weather-resistant seal may be achieved between the mounting surface 161 and the signaling unit 118. The signaling unit 118 may therefore be mounted to a mounting surface 161 to impede the entrance of contaminates, such as liquids, air with entrained moisture, and particulates. More specifically, in previous extension rings, only two mounting brackets 154 were used to couple the signaling unit 118 to the extension ring, thereby resulting in an inadequate seal. In the illustrated embodiment of the invention, four mounting brackets 154 are provided, one located in each corner of the extension ring 116.

Moreover, by providing four mounting brackets 154, with one located in each corner of the extension ring 116, the distortion of the signaling unit 118 during tightening of the mounting screws 158 is substantially reduced and a tight seal about the entire circumference of the signaling unit 118 can be achieved. Therefore, the weather-resistant seal of the seating surface 159 of the signaling unit 118 upon the mounting surface 161 is substantially maintained. Thus, water and other contaminates are impeded from infiltrating the signaling unit 118 and electrical components contained within the junction box 100.

Figure 5:
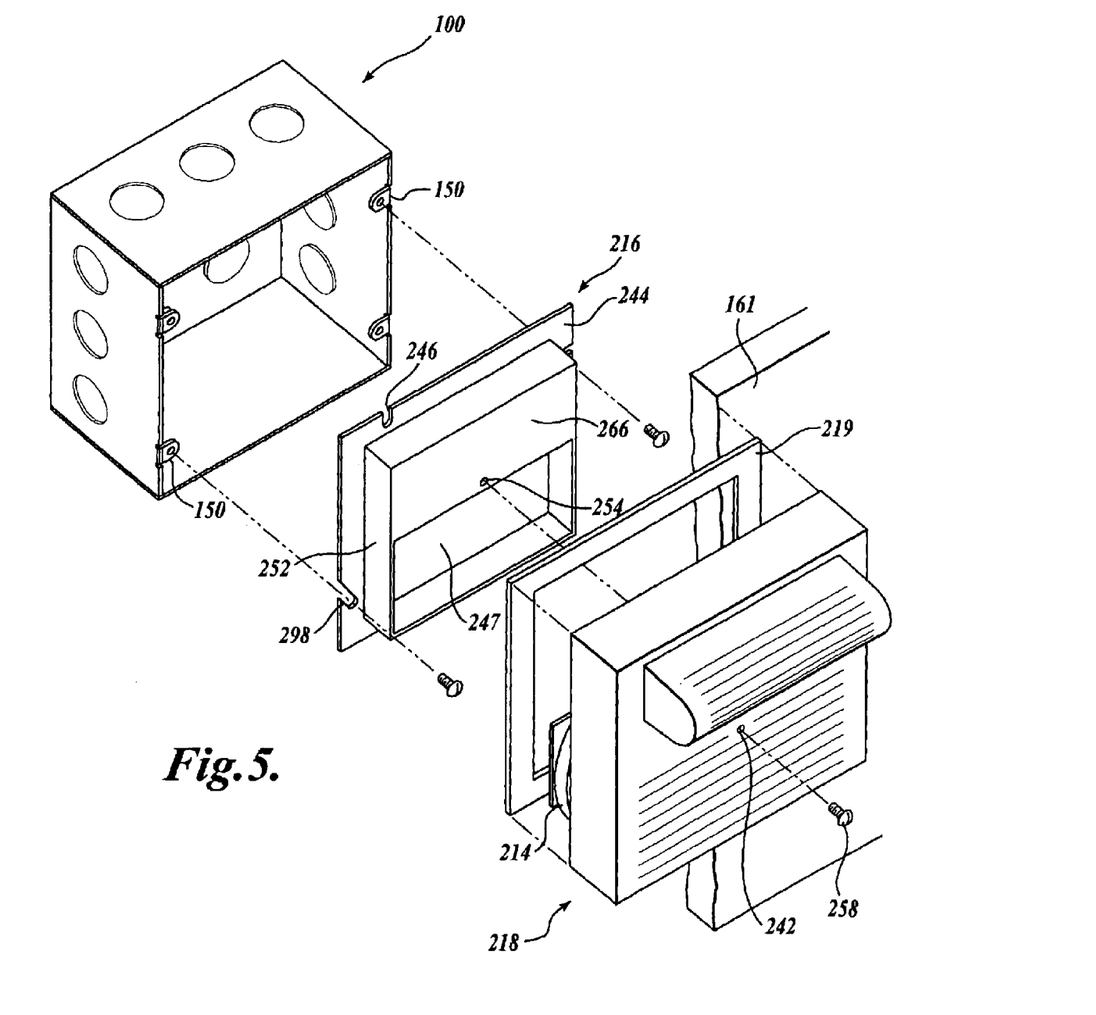
FIG. 5 is an exploded perspective view of an alternate embodiment of a junction box assembly, including an extension ring formed in accordance with the present invention, a junction box and an alarm signaling unit.
Figure 6:
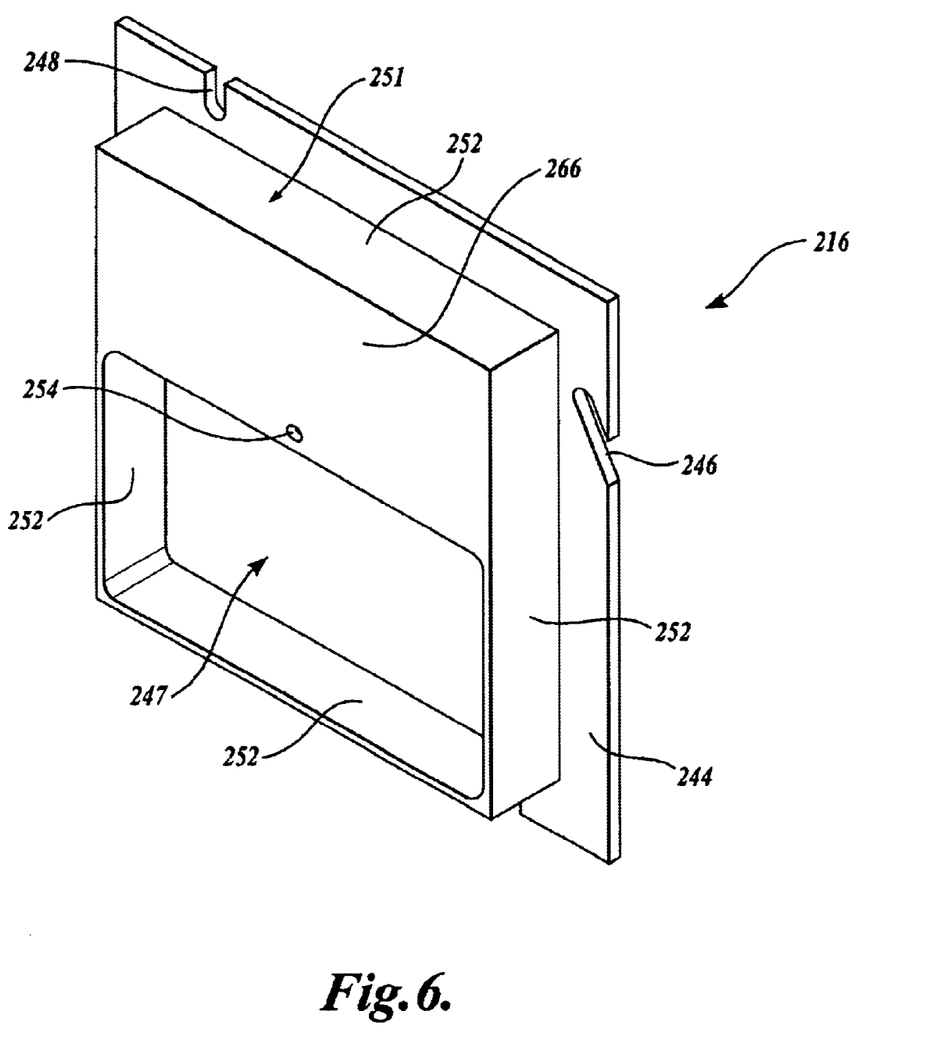
FIG. 6 is a perspective view of the extension ring shown in FIG. 5.

Referring now to FIGS. 5 and 6, an alternate embodiment of an extension ring 216 formed in accordance with the present invention is depicted. The extension ring 216 of this alternate embodiment provides an interface adapter between a five-inch square junction box 100, as described above, and an alternative signaling unit 218 having a single mounting screw hole 242, are known in the art.

The type of signaling unit typified by signaling unit 218 is typically provided with a rear box member (not shown) that is adapted to be attached to the signaling unit 218 to define an enclosure. Such an enclosure assembly, however, must be mounted to a surface, such as a wall, and therefore projects out significantly from the wall, and anticipates that the conduit to the signaling unit 218 will be positioned, at least in part, externally to the wall, Such prior art assemblies can be aesthetically unpleasing, and exposes the conduit and entire assembly to the elements. The present invention permits an internal junction box 100 to be used for mounting the signaling unit 218 to an exterior wall, while still providing a generally weather-resistant seal for the signaling unit 218.

Previous extension rings are incompatible for use with signaling units 218 having a centrally located mounting screw hole 242. For example, the extension ring 16 pictured in FIG. 2 is incompatible with a signaling unit having a centrally located mounting aperture, typically located a small distance vertically above the center of the signaling unit 218. The extension ring 216 of the illustrated alternate embodiment solves this problem by providing an extension ring 216 that incorporates a centrally located mounting aperture 254.

The extension ring 216, includes a substantially square peripheral flange 244, each side of which is approximately five inches in length and one-half an inch wide. Screw slots 246 and 248 are provided in the flange 244 and are positioned so that at least two of the slots 246, 248 will align with screw holes in two of four mounting brackets 150 provided around the periphery of a front edge of a junction box 100. An approximately four inch square flange or tube 251 formed from four sidewalls 252 extends forwardly from the flange 244. In the illustrated embodiment, the sidewalls 252 extend approximately five-eighths of an inch from the flange; however, it shall be apparent that the sidewalls 252 may extend any distance from the flange 244, including zero inches, one-half inch three-quarters of an inch, one and a half inches, etc. A rectangular-shaped mounting panel or a transverse plate 266 extends generally between two of the side walls 252 of the extension ring 216 so as to define an approximately three and one half inch by two and one quarter inch rectangular opening 247 for receiving a protruding portion 214 of a signaling unit 218, such as a horn. A mounting aperture 254 is provided through the mounting panel 266 so as to align with the mounting screw hole 242 of the signaling unit 218.

It should now be appreciated that the central location of the mounting screw hole 242, and corresponding mounting aperture 254 permits the signaling unit 218 to be mounted against a mounting surface 161 such that a tight seal is provided about the entire circumference of the signaling unit 218, to enable a weather-resistant interface, similar to that discussed above. As the screw 258 is tightened, a sealing surface that may include a gasket 219 is pressed against a mounting surface 161, such as an exterior surface of an exterior wall.

As should be apparent to one of skill in the art, the use of internally-mounted junction boxes, such as those of the illustrated embodiments, permit the conduit running to these junction boxes to be strung internally, underneath the mounting surface 161, thus providing an aesthetically pleasing appearance while also impeding impact damage to the conduit. Further, a sealant, such as a well-known silicone based product, may be provided about the periphery of the signaling unit to further improve the weather-resistant characteristics of the seal.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An alarm signal installation comprising, in combination:
- a junction box comprising a square rear panel approximately five inches square, four sides extending forwardly from said rear panel, and an open front end;
- an extension ring removably attachable to the junction box over the open front end of the junction box, the extension ring having a square outer flange portion and a center portion having a plurality of sidewalls defining a large aperture and a transverse plate covering a substantial portion of the large aperture, the transverse plate including a small threaded aperture that is located near the center of the large aperture;
- an alarm signaling unit having a front panel with a centrally located aperture and a rearwardly extending portion;
- a screw disposable through the aperture in the alarm signaling unit and threadably engaging the small threaded aperture in the transverse plate thereby removably attaching the alarm signaling unit to the extension ring.

2. The alarm signal installation of claim 1, wherein the extension ring is formed from a unitary panel.

3. The alarm signal installation of claim 1, wherein the rearwardly extending portion of the alarm signaling unit extends through the large aperture in the extension ring and into the junction box.

4. An extension ring having a square mounting flange approximately five inches square, a forwardly extending tube defined by four generally rectangular sides forwardly from the mounting flange, the sides defining a generally rectangular opening through the extension ring, the improvement comprising:
- (a) a mounting panel coupled to at least one rectangular side and oriented substantially parallel to the mounting flange such that the mounting panel covers a substantial portion of the rectangular opening; and
- (b) a threaded aperture in the mounting panel located near a center of the rectangular opening, and adapted to engage a threaded fastener for coupling an alarm signaling unit to the extension ring.

5. The improved extension ring of claim 4, wherein the mounting panel is coupled to at least three rectangular sides.

6. The improved extension ring of claim 4, wherein the extension ring is unitarily formed.

* * * * *